(12) United States Patent
Murata et al.

(10) Patent No.: US 6,603,610 B2
(45) Date of Patent: Aug. 5, 2003

(54) WIDE-ANGLE LENS SYSTEM

(75) Inventors: Masayuki Murata, Saitama (JP); Takayuki Ito, Saitama (JP)

(73) Assignee: Pentax Corporation, Tokyo (JP)

( * ) Notice: Subject to any disclaimer, the term of this patent is extended or adjusted under 35 U.S.C. 154(b) by 61 days.

(21) Appl. No.: 09/908,935

(22) Filed: Jul. 20, 2001

(65) Prior Publication Data

US 2002/0034021 A1 Mar. 21, 2002

(30) Foreign Application Priority Data

Jul. 26, 2000 (JP) ........................................ 2000-224765

(51) Int. Cl.⁷ ............................................... G02B 13/04
(52) U.S. Cl. ........................ 359/751; 359/753; 359/749; 359/752
(58) Field of Search .................... 359/749, 750, 359/751, 752, 753, 680–682

(56) References Cited

U.S. PATENT DOCUMENTS 5,557,473 A * 9/1996 Sugiyama et al. .......... 359/757
6,222,680 B1 * 4/2001 Yamamoto et al. ......... 359/680
2002/0060860 A1 * 5/2002 Murata et al. .............. 359/751

* cited by examiner

*Primary Examiner*—Scott J. Sugarman
*Assistant Examiner*—Deborah Raizen
(74) *Attorney, Agent, or Firm*—Greenblum & Bernstein, P.L.C.

(57) ABSTRACT

A wide-angle lens system includes a negative first lens group, and a positive second lens group. The first lens group includes a positive lens element, and a negative lens element. The wide-angle lens system satisfies the following conditions: $0<(\phi_{1-2}+\phi_{2-1})/\phi<0.3$ ... (1); $0.5<HF/HL<0.9$ ... (2); $\phi_{1-2}=(1-n_1)/r_{1-2}$; $\phi_{2-1}=(n_2-1)/r_{2-1}$; $\phi=1/f$; $n_1$: the refractive index of the positive lens element of the first lens group; $n_2$: the refractive index of the most object-side negative lens element of the first lens group; $r_{1-2}$: the radius of curvature of the image-side surface of the positive lens element of the first lens group; $r_{2-1}$: the radius of curvature of the object-side surface of the most object-side negative lens element of the first lens group; f: the focal length of the entire lens system; HF: the radius of a bundle of axial light rays with respect to the most object-side surface of the first lens group; and HL: the radius of a bundle of axial light rays with respect to the most object-side surface of the second lens group.

18 Claims, 8 Drawing Sheets

-0.1  0.1
SPHERICAL
ABERRATION

THE SINE
CONDITION

-0.1  0.1
SPHERICAL
ABERRATION

CHROMATIC
ABERRATION

— d Line
······ g Line
---- C Line

Fig. 2C
W=34.76°

-0.1  0.1
ASTIGMATISM

-1.0 (%) 1.0
DISTORTION

-0.1  0.1
SPHERICAL
ABERRATION

THE SINE
CONDITION

Fig. 8B
$F_{NO}=1.85$

—— d Line
······ g Line
---- C Line

-0.1  0.1
SPHERICAL
ABERRATION

CHROMATIC
ABERRATION

-0.1  0.1
ASTIGMATISM

Fig. 8D
W=35.54°

-1.0(%)1.0
DISTORTION

WIDE-ANGLE LENS SYSTEM

BACKGROUND OF THE INVENTION

1. Field of the Invention

The present invention relates to a wide-angle lens system for a single lens reflex camera.

2. Description of the Related Art

In a single lens reflex camera, the lens system thereof needs to have a back focal distance which is long enough to provide a quick-return mirror between the photographing lens system and the image plane. Accordingly, a retrofocus-type lens system in which the back focal distance is longer than the focal length of the lens system has been generally employed. Due to the optical arrangement of the retrofocus-type lens system, in which a negative first lens group and a positive second lens group are provided, in this order from the object, an optical power (hereinafter, power) distribution over the first and second lens groups is asymmetrical with respect to the diaphragm. As a result, negative distortion and field curvature tend to increase to the extent that an increase of optical performance of the lens system is hindered. Particularly, in the case of a wide-angle lens system having a smaller F-number, i.e., a faster-lens system, coma occurred on the sagittal plane (hereinafter, sagittal coma) and higher-order aberrations increase.

SUMMARY OF THE INVENTION

It is an object of the present invention to provide a wide-angle lens system having a small F-number (preferably, smaller than 2), thereby distortion occurred in the negative direction, field curvature, and sagittal coma can be sufficiently corrected.

In order to achieve the above-mentioned object, there is provided a wide-angle lens system including a negative first lens group and a positive second lens group, in this order form the object. The first lens group includes a positive lens element, and at least one negative lens element, in this order form the object. The wide-angle lens system satisfies the following conditions:

$$0 < (\phi_{1-2} + \phi_{2-1})/\phi < 0.3 \quad (1)$$

$$0.5 < HF/HL < 0.9 \quad (2)$$

wherein $\phi_{1-2} = (1-n_1)/r_{1-2}$;

$\phi_{2-1} = (n_2-1)/r_{2-1}$;

$\phi = 1/f$;

$n_1$ designates the refractive index of the positive lens element of the first lens group;

$n_2$ designates the refractive index of the most object-side negative lens element of the first lens group;

$r_{1-2}$ designates the radius of curvature of the image-side surface of the positive lens element of the first lens group;

$r_{2-1}$ designates the radius of curvature of the object-side surface of the most object-side negative lens element of the first lens group;

f designates the focal length of the entire lens system;

HF designates the height from the optical axis of a bundle of axial light rays with respect to the most object-side surface of the first lens group; and HL designates the height from the optical axis of a bundle of axial light rays with respect to the most object-side surface of the second lens group.

The wide-angle lens system preferably satisfies the following condition:

$$0 < d_1/f < 0.2 \quad (3)$$

wherein $d_1$ designates the axial distance, in the first lens group, between the positive lens element and the most object-side negative lens element.

The second lens group can include a positive first sub-lens group 2F and a positive second sub-lens group 2R, in this order from the object. The second lens group preferably satisfies the following condition:

$$0.1 < d_2/f < 0.5 \quad (4)$$

wherein $d_2$ designates the axial distance between the first sub-lens group 2F and the second sub-lens group 2R, when an object at an infinite photographing distance is in an in-focus state.

The second lens group preferably includes at least one aspherical surface thereon, and the aspherical surface satisfies the following condition:

$$-0.2 < \Delta V < 0 \quad (5)$$

wherein $\Delta V$ designates an aspherical-surface term in a distortion coefficient.

In a focusing operation, from infinity toward an object at a closer distance, performed by the wide-angle lens system of the present invention, a first focusing lens group Fa in which the first lens group and the first sub-lens group 2F are arranged to be integrally moved, and a second focusing lens group Fb constituted by the second sub-lens group 2R are preferably arranged to move independently from the image side toward the object side so that the distance therebetween becomes shorter. More concretely, the first focusing lens group Fa, and the second focusing lens group Fb can be moved according to at least the following patterns:

(i) the first focusing lens group Fa and the second focusing lens group Fb are moved from the image side toward the object side at a substantially constant ratio of the traveling distance of the second focusing lens group Fb to that of the first focusing lens group Fa; or (ii) the first focusing lens group Fa and the second focusing lens group Fb are moved from the image side toward the object side in such a way that the shorter the object distance is, the larger a ratio of the traveling distance of the second focusing lens group Fb to that of the first focusing lens group Fa becomes.

The positive second sub-lens group 2R can include a positive first minor sub-lens group 2R-1, a negative second minor sub-lens group 2R-2 and a positive third minor sub-lens group 2R-3. In this optical arrangement, a positive lens element in the positive first minor sub-lens group 2R-1 preferably satisfies the following condition:

$$1.7 < N_{2R-1p} \quad (6)$$

wherein $N_{2R-1p}$ designates the refractive index of the positive lens element of the positive first minor sub-lens group 2R-1.

Similarly, a negative lens element in the negative second minor sub-lens group 2R-2 preferably satisfies the following condition:

$$1.7 < N_{2R-2n} \quad (7)$$

wherein $N_{2R-2n}$ designates the refractive index of the negative lens element of the negative second minor sub-lens group 2R-2.

Still further, a positive lens element in the positive third minor sub-lens group 2R-3 preferably satisfies the following condition:

$$1.7 < N_{2R-3p} \quad (8)$$

wherein $N_{2R-3p}$ designates the refractive index of the positive lens element of the positive third minor sub-lens group 2R-3.

The above wide-angle lens system according to the present invention is suitable for a lens system with a F-number of less than 2, i.e., a faster lens system. In addition, the wide-angle lens system according to the present invention is suitable for a lens system with the half-angle-of-view of more than 33°.

The present disclosure relates to subject matter contained in Japanese Patent Application No.2000-224765 (filed on Jul. 26, 2000) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

The wide-angle lens system, shown in FIGS. 1, 4, 7 and 10, includes a negative first lens group 10 and a positive second lens group 20, in this order from the object. The first lens group 10 includes a positive lens element and two negative lens elements, in this order from the object. Each of the two negative lens elements has a convex surface facing toward the object. The second lens group 20 includes a positive first sub-lens group 20F (2F) and a positive second sub-lens group 20R (2R), in this order from the object. The positive first sub-lens group 20F includes a positive lens element. The positive second sub-lens group 20R includes a positive first minor sub-lens group 20a (2R-1) constituted by a negative lens element and a positive lens element which are cemented, a negative second minor sub-lens group 20b (2R-2) constituted by a negative lens element and a positive lens element which are cemented, and a positive third minor sub-lens group 20c (2R-3) constituted by a positive lens element. A diaphragm S is provided in the second lens group 20. In a focusing operation from infinity toward an object at a closer distance, the first focusing lens group Fa in which the first lens group 10 and the first sub-lens group 20F are arranged to be integrally moved, and the second focusing lens group Fb constituted by the second sub-lens group 20R are independently moved from the image side toward the object side so that the distance therebetween becomes shorter.

Condition (1) specifies the power of the air-lens formed, in the first lens group 10, between the positive lens element and the most object-side negative lens element.

If $(\phi_{1-2}+\phi_{2-1})/\phi$ exceeds the upper limit of condition (1), distortion occurred in the positive direction increases, and field curvature occurs largely in the negative direction.

If $(\phi_{1-2}+\phi_{2-1})/\phi$ exceeds the lower limit of condition (1), distortion occurred in the negative direction increases, and field curvature occurs largely in the positive direction.

Condition (2) specifies the height of upper axial light rays from the optical axis, and also specifies that the lens system is a retrofocus-type lens system.

If HF/HL exceeds the upper limit of condition (2), it becomes difficult to make the back focal distance longer.

If HF/HL exceeds the lower limit of condition (2), the back focal distance becomes unnecessarily long, which is disadvantageous for miniaturization of the lens system. Furthermore, distortion occurred in the negative direction increases.

Condition (3) specifies the axial distance, in the first lens group 10, between the positive lens element and the most object-side negative lens element.

If $d_1/f$ exceeds the upper limit of condition (3), distortion is over-corrected, so that the amount of distortion which occurs, in the positive direction, from an intermediate image height position over the outer periphery becomes larger. Accordingly, on the outer peripheral area, an image of an object having a straight-line shape becomes an wavy shape.

If $d_1/f$ exceeds the lower limit of condition (3), distortion is under-corrected, so that extremely strong distortion occurs at an intermediate image height position over the outer periphery. Accordingly, distortion occurred in the negative direction becomes noticeable at the peripheral area.

Condition (4) specifies the axial distance between the first sub-lens group 20F and the second sub-lens group 20R.

If $d_2/f$ exceeds the upper limit of condition (4), sagittal coma becomes larger, which causes a decrease of contrast. Furthermore, the overall length of the lens system becomes longer, which is disadvantageous for miniaturization of the lens system. Still further, it becomes difficult to secure peripheral illumination.

If $d_2/f$ exceeds the lower limit of condition (4), field curvature on the sagittal plane largely occurs in the negative direction, which causes a decrease of the resolution at an intermediate image height position over the outer periphery. Furthermore, when the first sub-lens group 20F and the second sub-lens group 20R are advanced toward the minimum photographing distance, these lens groups come into contact with each other, so that it becomes difficult to secure a sufficient minimum photographing distance. On the other hand, upon focusing from infinity toward the minimum photographing distance, if the first sub-lens group 20F and the second sub-lens group 20R are arranged to independently move, there is an effect of reducing field curvature occurred in the positive direction.

Condition (5) directly specifies an aspherical term in a distortion coefficient of an aspherical surface in the case where the aspherical surface is provided on at least one surface of the second lens group 20.

If $\Delta V$ exceeds the upper limit of condition (5), distortion is under-corrected.

If $\Delta V$ exceeds the lower limit of condition (5), distortion is over-corrected, and the amount of distortion which occurs, in the positive direction, from an intermediate image height position over the outer periphery also becomes larger.

Condition (6) specifies the refractive index of the positive lens element in the positive first minor sub-lens group 20a.

If $N_{2R-1p}$ exceeds the lower limit of condition (6), a lens-surface curvature to obtain necessary power becomes larger, so that higher-order aberrations largely occur.

Condition (7) specifies the refractive index of the negative lens element in the negative second minor sub-lens group 20b.

If $N_{2R-2n}$ exceeds the lower limit of condition (7), a lens-surface curvature to obtain necessary power becomes larger, so that higher-order aberrations largely occur.

Condition (8) specifies the refractive index of the positive lens element in the positive third minor sub-lens group 20c.

If $N_{2R-3p}$ exceeds the lower limit of condition (8), a lens-surface curvature to obtain necessary power becomes larger, so that higher-order aberrations largely occur.

Specific numerical data of the embodiments will be described hereinafter. In FIGS. 2A, 5A, 8A and 11A, SA designates spherical aberration, and SC designates the sine condition. In FIGS. 2B, 5B, 8B and 11B, the solid line and the two types of dotted lines respectively indicate spherical aberrations with respect to the d, g and C lines. Further, in FIGS. 2C, 5C, 8C and 11C, S designates the sagittal image, and M designates the meridional image. Still further, FIGS. 2D, 5D, 8D and 11D show distortion. In FIGS. 1, 3, 4, 6, 7, 9, 10 and 12, Y designates the image height, and I designates the image plane. In the tables, Fno designates the F-number, m designates the transverse magnification, f designates the focal length of the entire zoom lens system, W designates the half angle-of-view (°), fB designates the back focal distance, r designates the radius of curvature, d designates the lens-element thickness or distance between lens elements, Nd designates the refractive index of the d-line, and v designates the Abbe number.

In addition to the above, an aspherical surface which is symmetrical with respect to the optical axis is defined as follows:

$$x=cy^2/(1+[1-\{1+K\}c^2y^2]^{1/2})+A4y^4+A6y^6+A8y^8+A10y^{10}\ldots$$

wherein:
 c designates a curvature of the aspherical vertex (1/r);
 y designates a distance from the optical axis;
 K designates the conic coefficient; and A4 designates a fourth-order aspherical coefficient;
A6 designates a sixth-order aspherical coefficient;
A8 designates a eighth-order aspherical coefficient; and
A10 designates a tenth-order aspherical coefficient.

The relation between the aspherical coefficients and the aberration coefficients will be herein discussed.

1. The shape of an aspherical surface is defined as follows:

$$x=cy^2/(1+[1-\{1+K\}c^2y^2]^{1/2})+A4y^4+A6y^6+A8y^8+A10y^{10}\ldots$$

wherein:
 x designates a distance from a tangent plane of an aspherical vertex;
 y designates a distance from the optical axis;
 c designates a curvature of the aspherical vertex (1/r),
 K designates a conic constant;

2. In this equation, to obtain the aberration coefficients, the following substitution is made to replace K with "0" (Bi=Ai when K=0).

$$B4 = A4 + Kc^3/8;$$
$$B6 = A6 + (K^2 + 2K)c^5/16;$$
$$B8 = A8 + 5(K^3 + 3K^2 + 3K)c^7/128$$
$$B10 = A10 + 7(K^4 + 4K^3 + 6K^2 + 4K)c^9/256;$$

and therefore, the following equation is obtained:

$$x=cy^2/[1+[1-c^2y^2]^{1/2}]+B4y^4+B6y^6+B8y^8+B10y^{10}+\ldots$$

3. Furthermore, in order to normalize the focal length f to 1.0, the followings are considered:

$$X=x/f;\ Y=y/f;\ C=f*c;$$
$$\alpha4=f^3B4;\ \alpha6=f^5B6;\ \alpha8=f^7B8;\ \alpha10=f^9B10$$

Accordingly, the following equation is obtained.

$$X=CY^2/[1+[1-C^2Y^2]^{1/2}]+\alpha4Y^4+\alpha6Y^6+\alpha8Y^8+\alpha10Y^{10}+\ldots$$

4. $\Phi=8(N'-N)\alpha4$ is defined, and the third aberration coefficients are defined as follows:
 I designates the spherical aberration coefficient;
 II designates the coma coefficient;
 III designates the astigmatism coefficient;
 IV designates the curvature coefficient of the sagittal image surface; and
 V designates a distortion coefficient; and therefore, the influence of the fourth-order aspherical-surface coefficient ($\alpha4$) on each aberration coefficient is defined as:

$$\Delta I=h^4\Phi$$
$$\Delta II=h^3k\Phi$$
$$\Delta III=h^2k^2\Phi$$
$$\Delta IV=h^2k^2\Phi$$
$$\Delta V=hk^3\Phi$$

wherein
 h1 designates the height at which a paraxial axial light ray strikes the first surface of the lens system including the aspherical surface;
 h designates the height at which the paraxial axial light ray strikes the aspherical surface when the height h1 is 1;

k1 designates the height at which a paraxial off-axis ray, passing through the center of the entrance pupil, strikes the first surface of the lens system including the aspherical surface;

k designates the height at which the paraxial off-axis light ray strikes the aspherical surface when the height k1 is −1;

N' designates the refractive index of a medium on the side of the image with respect to the aspherical surface; and N designates the refractive index of a medium on the side of the object with respect to the aspherical surface.

In regard to the first lens group 10 and the second lens group 20, the power of each lens group is determined so that these lens groups constitute a retrofocus-type lens system, i.e., the front lens group (the first lens group 10) has negative power, and the rear lens group (the second lens group 20) has positive power. In a focusing operation, from infinity toward an object at a closer distance, the first focusing lens group Fa in which the first lens group 10 and the first sub-lens group 20F are arranged to be integrally moved, and the second focusing lens group Fb in which the positive first minor sub-lens group 20a, the negative second minor sub-lens group 20b, and the positive third minor sub-lens group 20c are arranged to be integrally moved, are arranged to independently move from the image side toward the object side so that the distance therebetween becomes shorter. Throughout embodiments which will be discussed hereinafter, it can be confirmed that between the first lens group 10 and the second lens group 20, there exists the maximum distance between lens elements in the lens system, i.e., d6 in FIG. 1. Therefore a definition, e.g., the entire lens system is divided into the first lens group 10 and the second lens group 20 at a position where the maximum 'between-the-lens-element' distance exists, can be possible.

[Embodiment 1]

Figure 1:
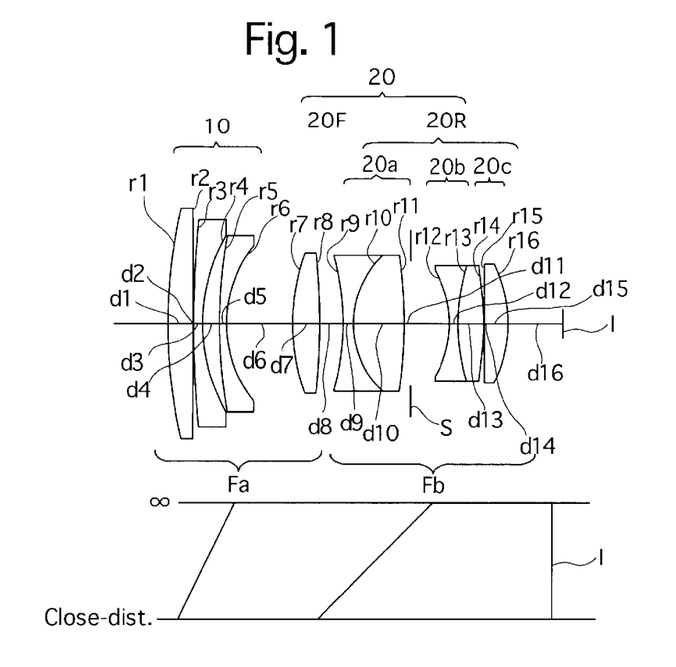
FIG. 1 is a lens arrangement of the wide-angle lens system according to a first embodiment of the present invention.
Figure 2A:
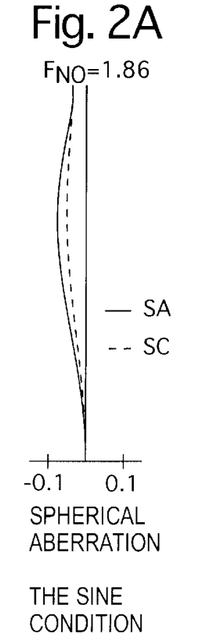
FIGS. 2A, 2B, 2C and 2D show aberrations occurred in the lens arrangement shown in FIG. 1.
Figure 2B:
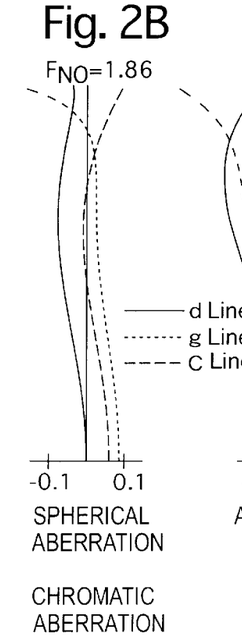
Figure 2C:
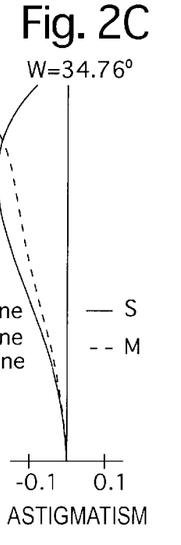
Figure 2D:
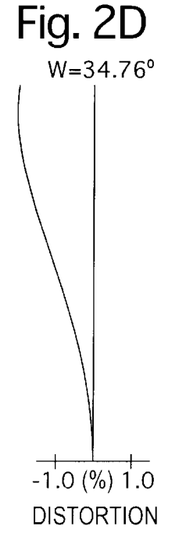
Figure 3A:
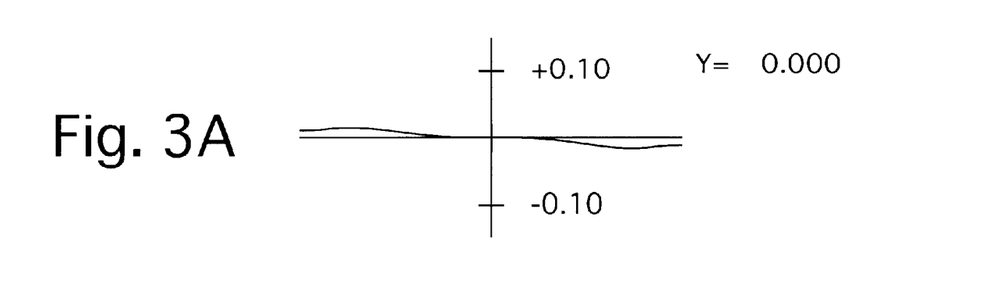
FIGS. 3A, 3B, 3C and 3D show sagittal coma occurred in the lens arrangement shown in FIG. 1.
Figure 3B:
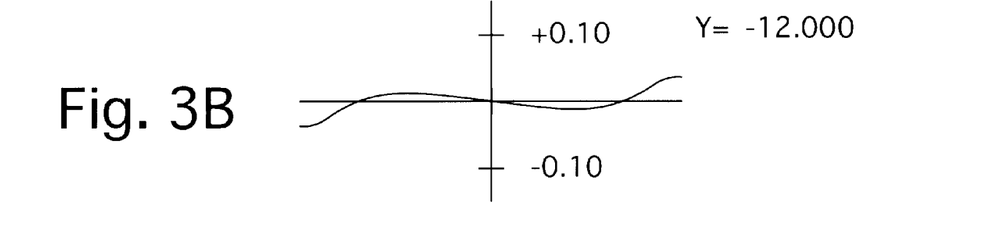
Figure 3C:
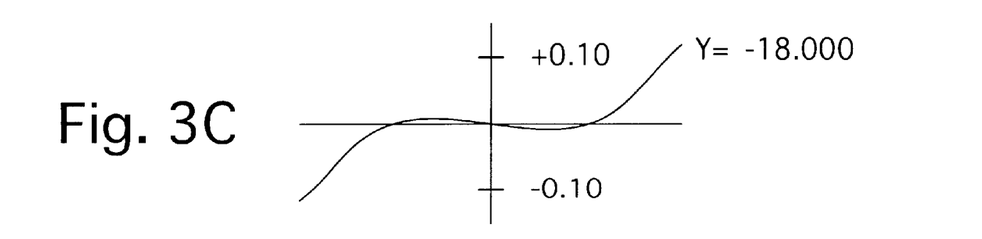
Figure 3D:
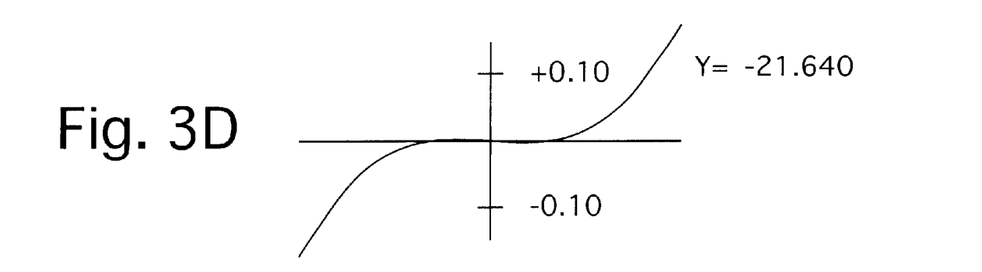

FIG. 1 is a lens arrangement of the wide-angle lens system according to a first embodiment. FIGS. 2A through 2D show aberrations occurred in the lens arrangement shown in FIG. 1. FIGS. 3A through 3D show sagittal coma occurred in the lens arrangement shown in FIG. 1. Table 1 shows the numerical data of the first embodiment. The first lens group 10 includes a positive lens element, and two negative meniscus lens elements, in this order from the object. Each of the two negative meniscus lens elements has a convex surface facing toward the object. The second lens group 20 includes the positive first sub-lens group 20F, and the positive second sub-lens group 20R, in this order from the object. The second sub-lens group 20R includes the positive first minor sub-lens group 20a, the negative second minor sub-lens group 20b, and the positive third minor sub-lens group 20c. The diaphragm S is provided, in the second lens group 20, between the first minor sub-lens group 20a and the second minor sub-lens group 20b. As shown at the bottom portion of FIG. 1, in a focusing operation, from infinity toward an object at a closer distance, the first focusing lens group Fa in which the first lens group 10 and the first sub-lens group 20F are arranged to be integrally moved, and the second focusing lens group Fb in which the positive first minor sub-lens group 20a, the negative second minor sub-lens group 20b, and the positive third minor sub-lens group 20c are arranged to be integrally moved, are arranged to independently move from the image side toward the object side so that the distance therebetween becomes shorter. Further, the first focusing lens group Fa and the second focusing lens group Fb are moved from the image side toward the object side at a substantially constant ratio of the traveling distance of the second focusing lens group Fb to that of the first focusing lens group Fa.

TABLE 1

$F_{NO} = 1:1.86$
$f = 31.81$
$m = 0.000- -0.020- -0.155$
$f_B = 36.93-37.57-41.90$
$W = 34.8°$

| Surface No. | r | d | Nd | ν |
|---|---|---|---|---|
| 1 | 95.700 | 4.68 | 1.72916 | 54.7 |
| 2 | −5402.519 | 0.10 | — | — |
| 3 | 195.220 | 1.67 | 1.76182 | 26.5 |
| 4 | 33.385 | 3.13 | — | — |
| 5 | 93.000 | 1.30 | 1.61800 | 63.4 |
| 6 | 23.440 | 12.29 | — | — |
| 7 | 38.680 | 5.00 | 1.80100 | 35.0 |
| 8 | −126.230 | 4.33-4.17-3.09 | — | — |
| 9 | −47.000 | 1.90 | 1.51742 | 52.4 |
| 10 | 17.500 | 9.39 | 1.80400 | 46.6 |
| 11 | −88.800 | 1.20 | — | — |
| Diaphragm | ∞ | 7.18 | — | — |
| 12 | −19.920 | 1.60 | 1.84666 | 23.8 |
| 13 | 36.650 | 4.74 | 1.72750 | 40.3 |
| 14* | −47.732 | 0.10 | — | — |
| 15 | 1382.845 | 4.42 | 1.77250 | 49.6 |
| 16 | −24.750 | 36.93-37.57-41.90 | — | — |

*designates the aspherical surface which is rotationally symmetrical with respect to the optical axis.

Aspherical surface data (the aspherical surface coefficients not indicated are zero (0.00)):

| Surf No. | K | A4 | A6 | A8 |
|---|---|---|---|---|
| 14 | 0.00 | $0.2023 \times 10^{-4}$ | $0.3840 \times 10^{-7}$ | $-0.5333 \times 10^{-10}$ |

[Embodiment 2]

Figure 4:
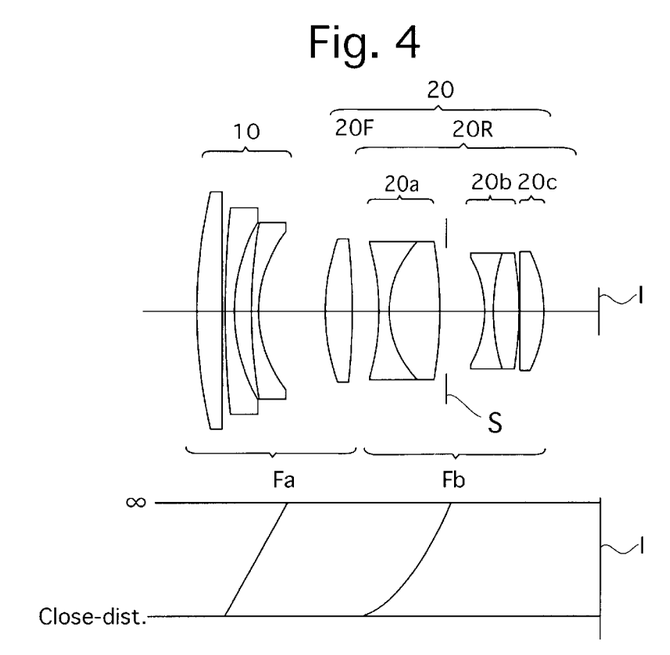
FIG. 4 is a lens arrangement of the wide-angle lens system according to a second embodiment of the present invention.
Figure 5A:
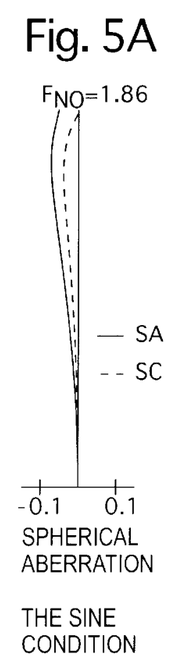
FIGS. 5A, 5B, 5C and 5D show aberrations occurred in the lens arrangement shown in FIG. 4.
Figures 5B, 5C:
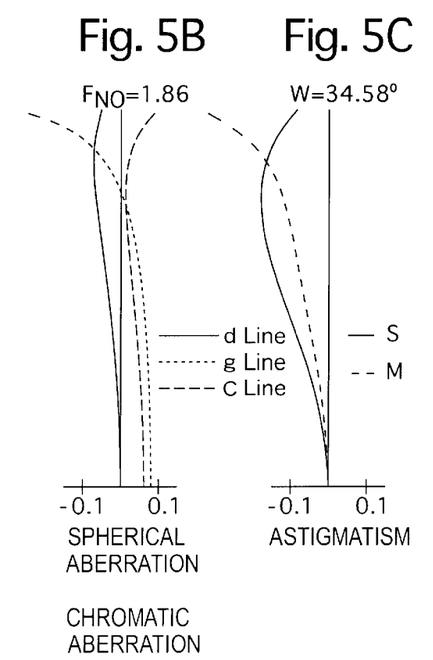
Figure 5D:
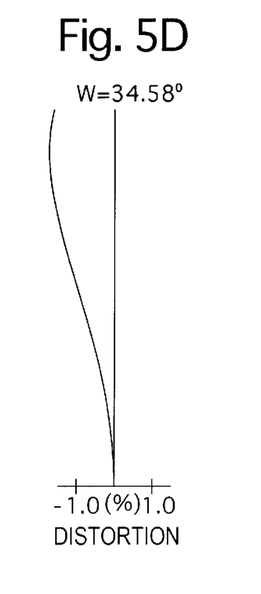
Figure 6A:
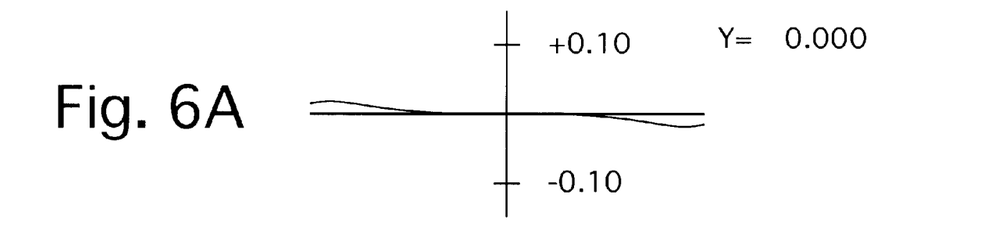
FIGS. 6A, 6B, 6C and 6D show sagittal coma occurred in the lens arrangement shown in FIG. 4.
Figure 6B:
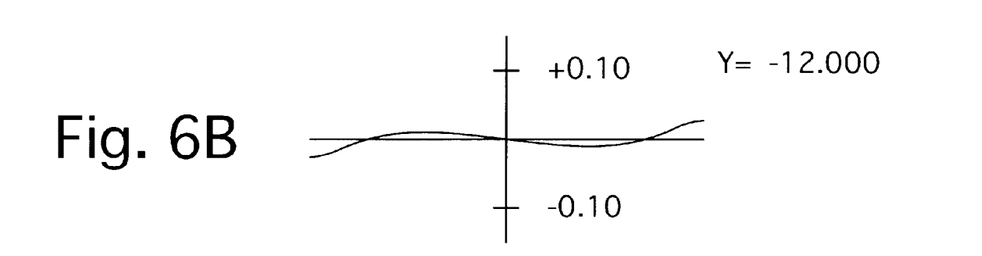
Figure 6C:
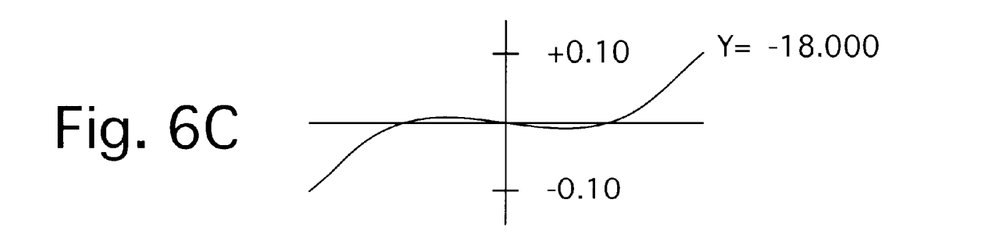
Figure 6D:
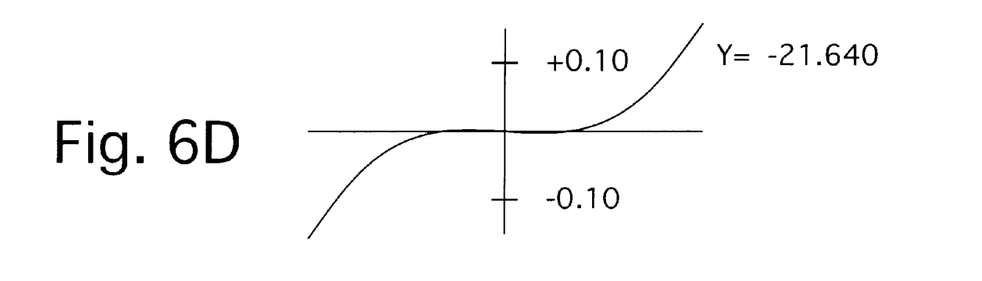

FIG. 4 is a lens arrangement of the wide-angle lens system according to a second embodiment. FIGS. 5A through 5D show aberrations occurred in the lens arrangement shown in FIG. 4. FIGS. 6A through 6D show sagittal coma occurred in the lens arrangement shown in FIG. 4. Table 2 shows the numerical data of the second embodiment. The basic lens arrangement of the second embodiment is the same as the first embodiment. As shown at the bottom portion of FIG. 4, in a focusing operation, from infinity toward an object at a closer distance, the first focusing lens group Fa in which the first lens group 10 and the first sub-lens group 20F are arranged to be integrally moved, and the second focusing lens group Fb in which the positive first minor sub-lens group 20a, the negative second minor sub-lens group 20b, and the positive third minor sub-lens group 20c are arranged to be integrally moved, are arranged to independently move from the image side toward the object side so that the distance therebetween becomes shorter. Further, the first focusing lens group Fa and the second focusing lens group Fb are moved from the image side toward the object side in such a way that the shorter the object distance is, the larger a ratio of the traveling distance of the second focusing lens group Fb to that of the first lens group Fa becomes.

TABLE 2

$F_{NO} = 1:1.86$
$f = 31.90$
m = 0.000- -0.020- -0.156
$f_B$ = 36.87-37.52-41.88
W = 34.6°

| Surface No. | r | d | Nd | ν |
|---|---|---|---|---|
| 1 | 95.700 | 4.68 | 1.72916 | 54.7 |
| 2 | −5402.519 | 0.53 | — | — |
| 3 | 195.220 | 1.67 | 1.76182 | 26.5 |
| 4 | 33.385 | 3.13 | — | — |
| 5 | 93.000 | 1.30 | 1.61800 | 63.4 |
| 6 | 23.440 | 12.29 | — | — |
| 7 | 38.680 | 5.00 | 1.80100 | 35.0 |
| 8 | −126.230 | 4.96-4.87-3.74 | — | — |
| 9 | −44.100 | 1.90 | 1.51742 | 52.4 |
| 10 | 18.000 | 9.39 | 1.80400 | 46.6 |
| 11 | −76.639 | 1.20 | — | — |
| Diaphragm | ∞ | 7.08 | — | — |
| 12 | −20.325 | 1.60 | 1.84666 | 23.8 |
| 13 | 36.650 | 4.74 | 1.72750 | 40.3 |
| 14* | −48.377 | 0.10 | — | — |
| 15 | 1644.629 | 4.42 | 1.77250 | 49.6 |
| 16 | −25.200 | 36.87-37.52-41.88 | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | $0.2012 \times 10^{-4}$ | $0.2416 \times 10^{-7}$ | $0.9119 \times 10^{-11}$ |

[Embodiment 3]

Figure 7:
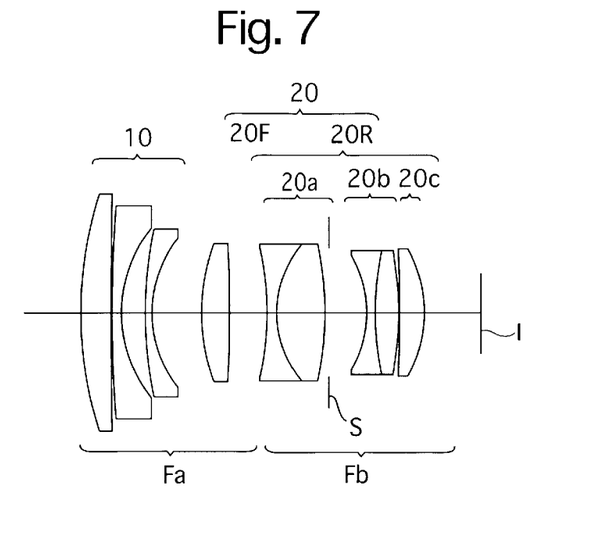
FIG. 7 is a lens arrangement of the wide-angle lens system according to a third embodiment of the present invention.
Figure 8A:
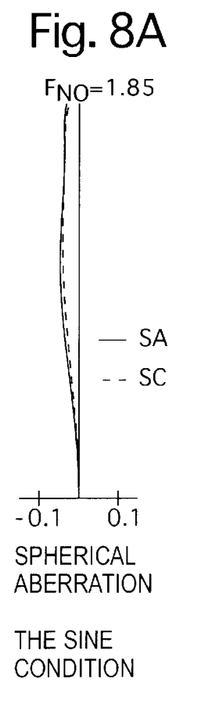
FIGS. 8A, 8B, 8C and 8D show aberrations occurred in the lens arrangement shown in FIG. 7.
Figures 8B, 8C:
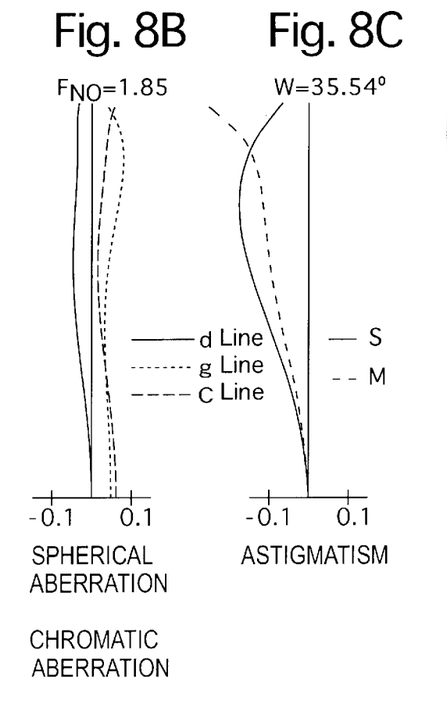
Figure 8D:
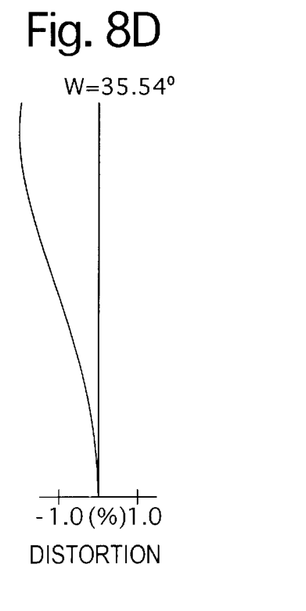
Figure 9A:
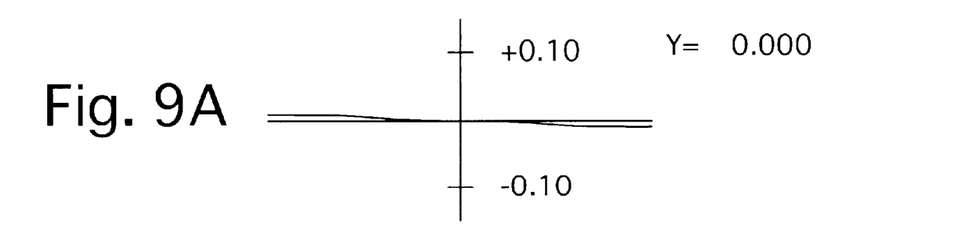
FIGS. 9A, 9B, 9C and 9D show sagittal coma occurred in the lens arrangement shown in FIG. 7.
Figure 9B:
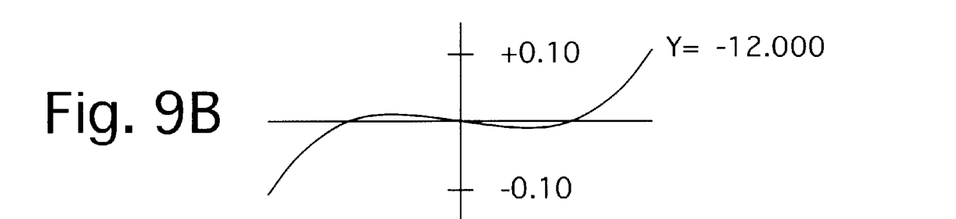
Figures 9C, 9D:
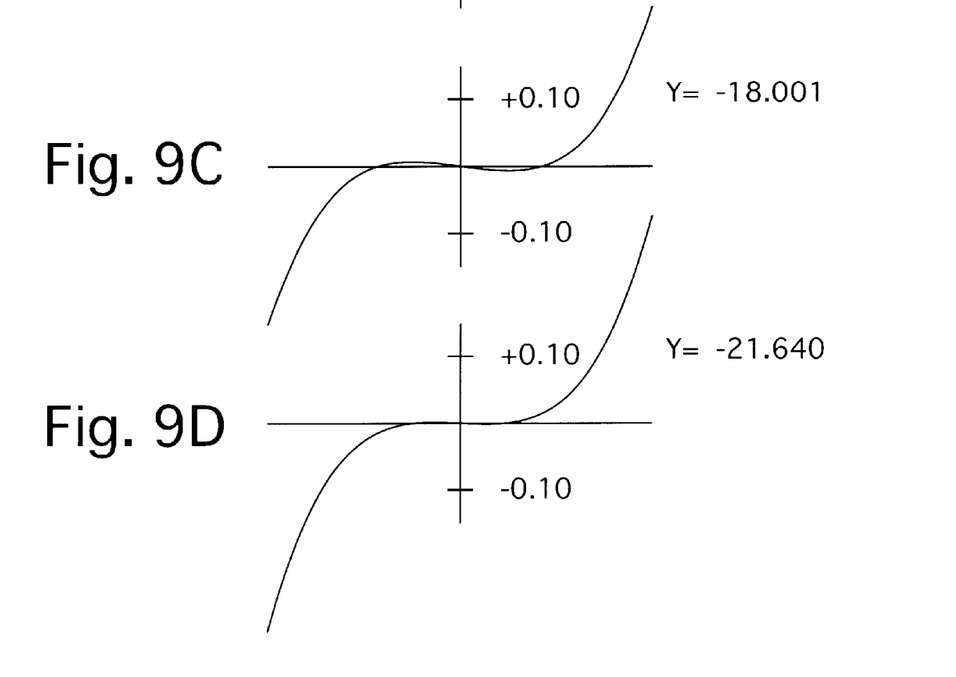

FIG. 7 is a lens arrangement of the wide-angle lens system according to a third embodiment. FIGS. 8A through 8D show aberrations occurred in the lens arrangement shown in FIG. 7. FIGS. 9A through 9D show sagittal coma occurred in the lens arrangement shown in FIG. 7. Table 3 shows the numerical data of the third embodiment. In the third embodiment, the basic lens arrangement and the focusing operation are the same as the first embodiment.

TABLE 3

$F_{NO} = 1:1.85$
$f = 30.90$
m = 0.000- -0.020- -0.149
$f_B$ = 37.33-37.95-41.94
W = 35.5°

| Surface No. | r | d | Nd | ν |
|---|---|---|---|---|
| 1 | 68.996 | 5.35 | 1.72916 | 54.7 |
| 2 | 1151.913 | 0.15 | — | — |
| 3 | 249.758 | 1.67 | 1.64769 | 33.8 |
| 4 | 24.275 | 4.19 | — | — |
| 5 | 72.171 | 1.20 | 1.61800 | 63.4 |
| 6 | 21.571 | 8.80 | — | — |
| 7 | 35.383 | 5.00 | 1.80100 | 35.0 |
| 8 | −214.619 | 6.69-6.49-5.16 | — | — |
| 9 | −52.258 | 1.70 | 1.53172 | 48.9 |
| 10 | 18.699 | 8.56 | 1.80400 | 46.6 |
| 11 | −57.906 | 0.70 | — | — |
| Diaphragm | ∞ | 6.64 | — | — |
| 12 | −20.551 | 1.50 | 1.84666 | 23.8 |
| 13 | 54.517 | 4.16 | 1.72750 | 40.3 |
| 14* | −44.919 | 0.10 | — | — |

TABLE 3-continued $F_{NO} = 1:1.85$
$f = 30.90$
m = 0.000- -0.020- -0.149
$f_B$ = 37.33-37.95-41.94
W = 35.5°

| Surface No. | r | d | Nd | ν |
|---|---|---|---|---|
| 15 | −302.291 | 4.36 | 1.77250 | 49.6 |
| 16 | −23.318 | 37.33-37.95-41.94 | — | — |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 14 | 0.00 | $0.2060 \times 10^{-4}$ | $0.3649 \times 10^{-7}$ | $-0.5445 \times 10^{-10}$ |

[Embodiment 4]

Figure 10:
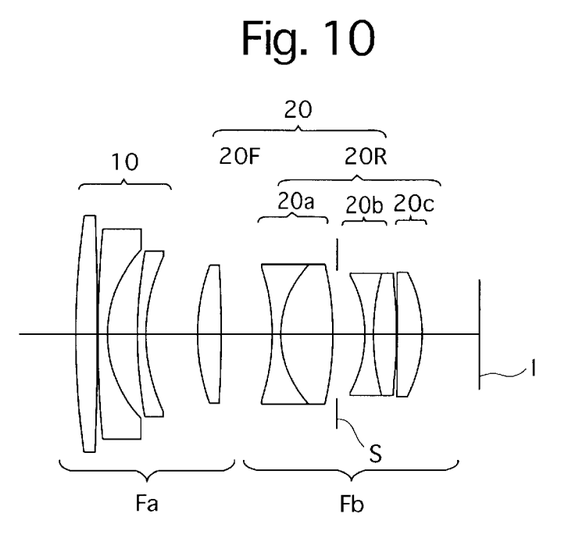
FIG. 10 is a lens arrangement of the wide-angle lens system according to a fourth embodiment of the present invention.
Figure 11A:
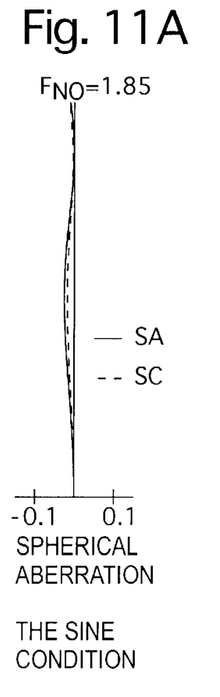
FIGS. 11A, 11B, 11C and 11D show aberrations occurred in the lens arrangement shown in FIG. 10.
Figures 11B, 11C:
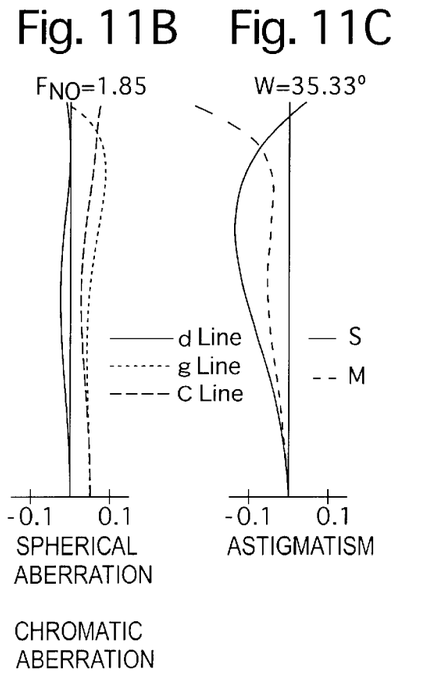
Figure 11D:
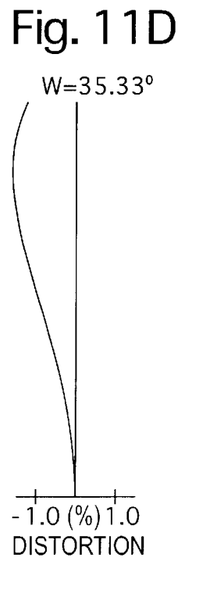
Figure 12A:
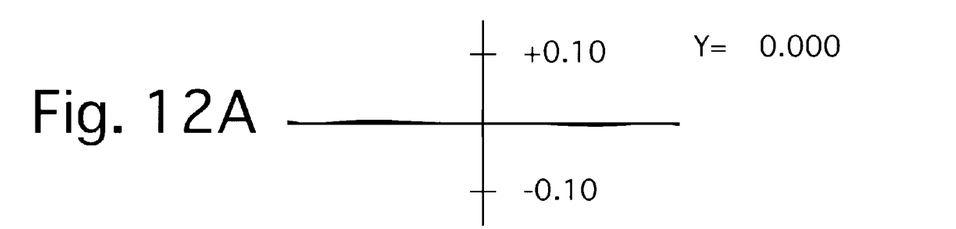
FIGS. 12A, 12B, 12C and 12D show sagittal coma occurred in the lens arrangement shown in FIG. 10.
Figure 12B:
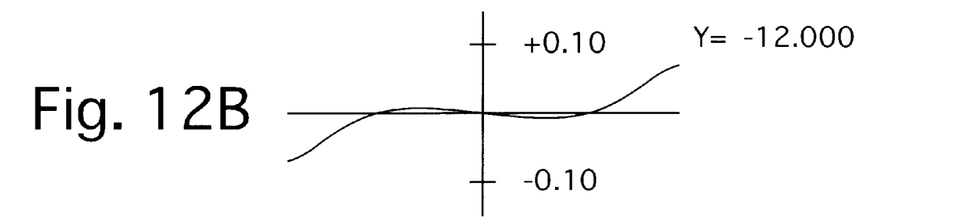
Figures 12C, 12D:
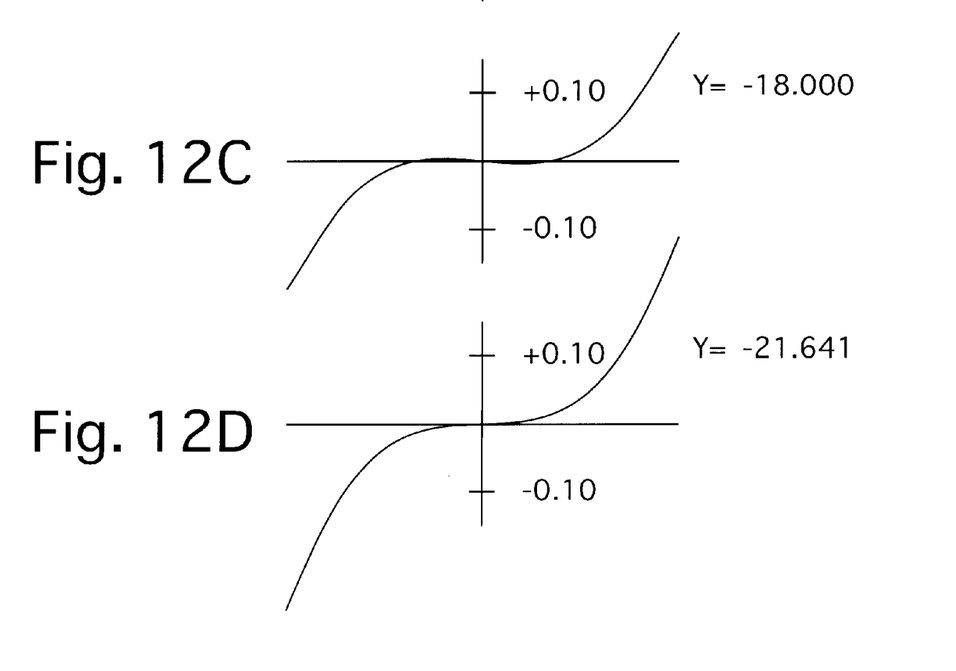

FIG. 10 is a lens arrangement of the wide-angle lens system according to a fourth embodiment. FIGS. 11A through 11D show aberrations occurred in the lens arrangement shown in FIG. 10. FIGS. 12A through 12D show sagittal coma occurred in the lens arrangement shown in FIG. 10. Table 4 shows the numerical data of the fourth embodiment. In the fourth embodiment, the basic lens arrangement and the focusing operation are the same as the first embodiment.

TABLE 4

$F_{NO} = 1:1.85$
$f = 30.90$
m = 0.000- -0.020- -0.149
$f_B$ = 36.90-37.53-41.53
W = 35.3°

| Surface No. | r | d | Nd | ν |
|---|---|---|---|---|
| 1 | 149.592 | 3.80 | 1.77250 | 49.6 |
| 2 | −600.737 | 0.10 | — | — |
| 3 | 204.372 | 1.67 | 1.62713 | 35.2 |
| 4 | 21.638 | 5.33 | — | — |
| 5 | 81.276 | 1.50 | 1.61800 | 63.4 |
| 6 | 31.870 | 9.15 | — | — |
| 7 | 36.155 | 4.16 | 1.83400 | 37.2 |
| 8 | −205.958 | 8.96-8.65-6.65 | — | — |
| 9 | −38.076 | 1.50 | 1.52000 | 50.8 |
| 10 | 18.000 | 9.19 | 1.81000 | 47.3 |
| 11 | −55.227 | 0.70 | — | — |
| Diaphragm | ∞ | 4.92 | — | — |
| 12 | −22.345 | 1.50 | 1.81874 | 24.7 |
| 13 | 41.606 | 4.09 | 1.72750 | 40.3 |
| 14* | −61.973 | 0.10 | — | — |
| 15 | −3505.674 | 4.42 | 1.72916 | 54.7 |
| 16 | −25.020 | 36.90-37.53-41.53 | — | — |

*designates the aspherical surface which is rotationally symmetrical with respect to the optical axis.

Aspherical surface data (the aspherical surface coefficients not indicated are zero (0.00)):

| .No. | K | A4 | A6 | A8 |
|---|---|---|---|---|
| 14 | 0.00 | $0.2266 \times 10^{-4}$ | $0.3590 \times 10^{-7}$ | $-0.6000 \times 10^{-10}$ |

The numerical values of each condition of each embodiment are shown in Table 5.

TABLE 5

|  | Embod. 1 | Embod. 2 | Embod. 3 | Embod. 4 |
|---|---|---|---|---|
| Condition (1) | 0.128 | 0.129 | 0.061 | 0.135 |
| Condition (2) | 0.683 | 0.687 | 0.720 | 0.682 |
| Condition (3) | 0.003 | 0.017 | 0.005 | 0.003 |
| Condition (4) | 0.136 | 0.156 | 0.217 | 0.290 |
| Condition (5) | −0.117 | −0.112 | −0.086 | −0.050 |
| Condition (6) | 1.804 | 1.804 | 1.804 | 1.810 |
| Condition (7) | 1.847 | 1.847 | 1.847 | 1.819 |
| Condition (8) | 1.773 | 1.773 | 1.773 | 1-729 |

As can be understood from Table 5, each embodiment satisfies each condition. Furthermore, as can be understood from the aberration diagrams, the various aberrations can be adequately corrected.

According to the above description, a wide-angle lens system with a small F-number, in which thereby negative distortion, field curvature, and sagittal coma can be sufficiently corrected, can be obtained.

What is claimed is:

1. A wide-angle lens system comprising a negative first lens group and a positive second lens group, in this order from an object, said first lens group comprising a positive lens element and at least one negative lens element, in this order from the object, and said second lens group comprising at least one aspherical surface, said at least one aspherical surface satisfying the following condition:

$$-0.2 < \Delta V < 0$$

wherein $\Delta V$ designates an aspherical-surface term in a distortion coefficient;

wherein the wide-angle lens system satisfies the following conditions:

$$0 < (\phi_{1-2} + \phi_{2-1})/\phi < 0.3$$

$$0.5 < HF/HL < 0.9$$

wherein $\phi_{1-2} = (1-n_1)/r_{1-2}$;

$\phi_{2-1} = (n_2-1)/r_{2-1}$;

$\phi = 1/f$;

$n_1$ designates a refractive index of said positive lens element of said first lens group;

$n_2$ designates a refractive index of a most object-side negative lens element of said first lens group;

$r_{1-2}$ designates a radius of curvature of an image-side surface of said positive lens element of said first lens group;

$r_{2-1}$ designates a radius of curvature of an object-side surface of the most object-side negative lens element of said first lens group;

f designates a focal length of the wide-angle lens system;

HF designates a radius of a bundle of axial light rays with respect to a most object-side surface of said first lens group; and HL designates a radius of a bundle of axial light rays with respect to a most object-side surface of said second lens group.

2. The wide-angle lens system according to claim 1, further satisfying the following condition:

$$0 < d_1/f < 0.2$$

wherein $d_1$ designates an axial distance, in said first lens group, between the positive lens element and a most object-side negative lens element.

3. The wide-angle lens system according to claim 1, wherein said second lens group comprises a positive first sub-lens group 2F, and a positive second sub-lens group 2R, in this order from the object; and wherein said second lens group satisfies the following condition:

$$0.1 < d_2/f < 0.5$$

wherein $d_2$ designates an axial distance between the first sub-lens group 2F and the second sub-lens group 2R, when the object at an infinite photographing distance is in an in-focus state.

4. The wide-angle lens system according to claim 1, wherein in a focusing operation, from infinity toward the object at a closer distance, a first focusing lens group Fa, in which said first lens group and a first sub-lens group 2F of the second lens group are configured to be integrally moved, and a second focusing lens group Fb, comprising a second sub-lens group 2R of the second lens group, are arranged to independently move from the image side toward the object side so that a distance between the first focusing lens group Fa and the second focusing lens group Fb becomes shorter.

5. The wide-angle lens system according to claim 4, wherein the first focusing lens group Fa and the second focusing lens group Fb are moved from the image side toward the object side at a constant ratio of a traveling distance of the second focusing lens group Fb to a traveling distance of the first focusing lens group Fa.

6. The wide-angle lens system according to claim 4, wherein the first focusing lens group Fa and the second focusing lens group Fb are configured to move from the image side toward the object side such that an object distance is inversely proportional to a ratio of a traveling distance of the second focusing lens group Fb to a traveling distance of the first lens group Fa.

7. The wide-angle lens system according to claim 3, wherein the positive second sub-lens group 2R comprises a positive first minor sub-lens group 2R-1, a negative second minor sub-lens group 2R-2, and a positive third minor sub-lens group 2R-3;

wherein a positive lens element in the positive first minor sub-lens group 2R-1 satisfies the following condition:

$$1.7 < N_{2R-1p}$$

wherein $N_{2R-1p}$ designates a refractive index of the positive lens element of the positive first minor sub-lens group 2R-1;

wherein a negative lens element in the negative second minor sub-lens group 2R-2 satisfies the following condition:

$$1.7 < N_{R2-2n}$$

wherein $N_{2R-2n}$ designates a refractive index of the negative lens element of the negative second minor sub-lens group 2R-2; and wherein a positive lens element in the positive third minor sub-lens group 2R-3 satisfies the following condition:

$$1.7 < N_{2R-3p}$$

wherein $N_{2R-3p}$ designates a refractive index of the positive lens element of the positive third minor sub-lens group 2R-3.

8. The wide-angle lens system according to claim 1, having a F-number of less than 2.

9. The wide-angle lens system according to claim 1, having a half-angle-of-view of more than 33°.

10. A wide-angle lens system comprising a negative first lens group and a positive second lens group, in this order from an object, said first lens group comprising a positive lens element and at least one negative lens element, in this order from the object;

wherein, in a focusing operation from infinity toward the object at a closer distance, a first focusing lens group Fa and a second focusing lens group Fb are configured to independently move from an image side toward an object side, to reduce a distance between the first focusing lens group Fa and the second focusing lens group Fb, the first focusing lens group Fa comprising said first lens group and a first sub-lens group 2F of the second lens group, which are configured to be integrally moved, and the second focusing lens group Fb comprising a second sub-lens group 2R of the second lens group; and wherein the wide-angle lens system satisfies the following conditions:

$$0 < (\phi_{1-2} + \phi_{2-1})/\phi < 0.3$$

$$0.5 < HF/HL < 0.9$$

wherein $$\phi_{1-2} = (1 - n_1)/r_{1-2};$$

$$\phi_{2-1} = (n_2 - 1)/r_{2-1};$$

$$\phi = 1/f;$$

$n_1$ designates a refractive index of said positive lens element of said first lens group;

$n_2$ designates a refractive index of a most object-side negative lens element of said first lens group;

$r_{1-2}$ designates a radius of curvature of an image-side surface of said positive lens element of said first lens group;

$r_{2-1}$ designates a radius of curvature of an object-side surface of the most object-side negative lens element of said first lens group;

f designates a focal length of the wide-angle lens system;

HF designates a radius of a bundle of axial light rays with respect to a most object-side surface of said first lens group; and HL designates a radius of a bundle of axial light rays with respect to a most object-side surface of said second lens group.

11. The wide-angle lens system according to claim 10, further satisfying the following condition:

$$0 < d_1/f < 0.2$$

wherein $d_1$ designates an axial distance, in said first lens group, between the positive lens element and a most object-side negative lens element.

12. The wide-angle lens system according to claim 10, said second lens group comprising the first sub-lens group 2F and the second sub-lens group 2R, in this order from the object, each of the first sub-lens group 2F and the second sub-lens group 2R comprising a positive sub-lens group;

wherein said second lens group satisfies the following condition:

$$0.1 < d_2/f < 0.5$$

wherein $d_2$ designates an axial distance between the first sub-lens group 2F and the second sub-lens group 2R, when the object at an infinite photographing distance is in an in-focus state.

13. The wide-angle lens system according to claim 10, said second lens group comprising at least one aspherical surface, said at least one aspherical surface satisfying the following condition:

$$-0.2 < \Delta V < 0$$

wherein $\Delta V$ designates an aspherical-surface term in a distortion coefficient.

14. The wide-angle lens system according to claim 10, wherein the first focusing lens group Fa and the second focusing lens group Fb are moved from the image side toward the object side at a constant ratio of a traveling distance of the second focusing lens group Fb to a traveling distance of the first focusing lens group Fa.

15. The wide-angle lens system according to claim 10, wherein the first focusing lens group Fa and the second focusing lens group Fb are configured to move from the image side toward the object side such that a distance to the object is inversely proportional to a ratio of a traveling distance of the second focusing lens group Fb to a traveling distance of the first lens group Fa.

16. The wide-angle lens system according to claim 12, wherein the positive second sub-lens group 2R comprises a positive first minor sub-lens group 2R-1, a negative second minor sub-lens group 2R-2 and a positive third minor sub-lens group 2R-3;

wherein a positive lens element in the positive first minor sub-lens group 2R-1 satisfies the following condition:

$$1.7 < N_{2R-1p}$$

wherein $N_{2R-1p}$ designates a refractive index of the positive lens element of the positive first minor sub-lens group 2R-1;

wherein a negative lens element in the negative second minor sub-lens group 2R-2 satisfies the following condition:

$$1.7 < N_{2R-2n}$$

wherein $N_{2R-2n}$ designates a refractive index of the negative lens element of the negative second minor sub-lens group 2R-2; and wherein a positive lens element in the positive third minor sub-lens group 2R-3 satisfies the following condition:

$$1.7 < N_{2R-3p}$$

wherein $N_{2R-3p}$ designates a refractive index of the positive lens element of the positive third minor sub-lens group 2R-3.

17. The wide-angle lens system according to claim 10, having a F-number less than 2.

18. The wide-angle lens system according to claim 10, having a half-angle-of-view greater than 33 degrees.

* * * * *